United States Patent [19]
Dibbern, Jr. et al.

[11] Patent Number: 5,934,143
[45] Date of Patent: Aug. 10, 1999

[54] ARMATURE SHAFT DEFLECTION LIMITER

[75] Inventors: John E. Dibbern, Jr., Street; Lynn E. Lentino, Westminster; William R. Stumpf, Kingsville, all of Md.

[73] Assignee: Black & Decker Inc., Del.

[21] Appl. No.: 09/233,956

[22] Filed: Jan. 20, 1999

Related U.S. Application Data

[63] Continuation of application No. 08/315,208, Sep. 29, 1994, Pat. No. 5,873,282.

[51] Int. Cl.[6] ........................................................ F16H 1/12
[52] U.S. Cl. .......................... 74/421 A; 74/421 R; 30/391
[58] Field of Search .............................. 74/421 A, 421 R; 30/391; 384/624; 310/83

[56] References Cited

U.S. PATENT DOCUMENTS 3,873,862  3/1975  Butler .
3,973,449  8/1976  Berlinger, Jr. .

FOREIGN PATENT DOCUMENTS 0082375  6/1983  European Pat. Off. .

*Primary Examiner*—John A. Jeffery
*Assistant Examiner*—David Fenstermacher
*Attorney, Agent, or Firm*—Dennis A. Dearing; John D. Del Ponti; Bruce S. Shapiro

[57] ABSTRACT

An apparatus for limiting deflection of the armature shaft 38, 38', 103 of an electrically powered tool, such as a hand held saw 10 or drill 91. In saw 10, the armature shaft 38, 38' extends as a cantilever from the motor 14 and has a geared connection 58, 60 to an arbor 44 for driving the saw blade 18. An arrangement for limiting the deflection of the armature shaft 38, 38' comprises a pilot member 72, 84 and a socket 68, 82 associated, respectively, with one and the other of the armature shaft and a motor housing supported wall. The socket 68, 82 is larger in cross-section than that of the pilot member 72, 84 and limits transverse deflection of the armature shaft 38, 38' away from its axis of rotation A. If the saw 10 stalls in the material being cut, force is transmitted from the geared connection 58, 60 to the armature shaft 38, 38'. The socket 68, 82 and pilot member 72, 84 permit the armature shaft 38, 38' to deflect a predetermined amount to counteract torques resulting from the geared connection 58, 60. In one embodiment, the pilot 72 extends from the armature shaft 38 to be received in an aperture 68 formed in the housing wall 66. In another embodiment, the pilot 84 extends from the housing wall 66' to be received in a bore 82 formed in the armature shaft 38'. According to a third embodiment, in drill 91, the shaft deflection limiter is constituted by an armature shaft pilot 111 disposed in a roller bearing aperture 117.

8 Claims, 4 Drawing Sheets

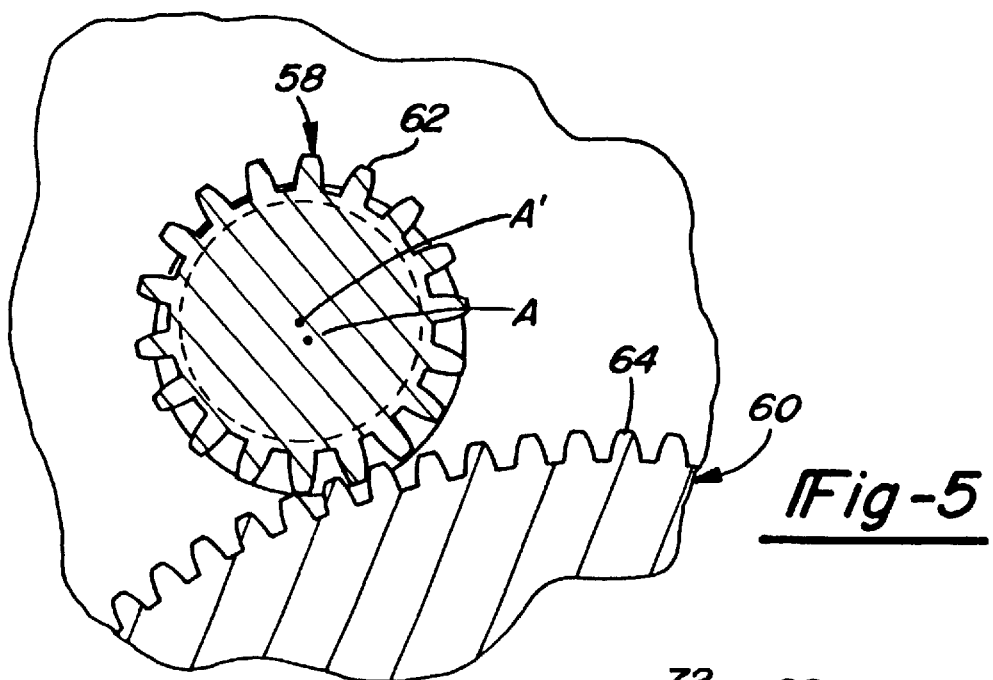
_Fig-5_
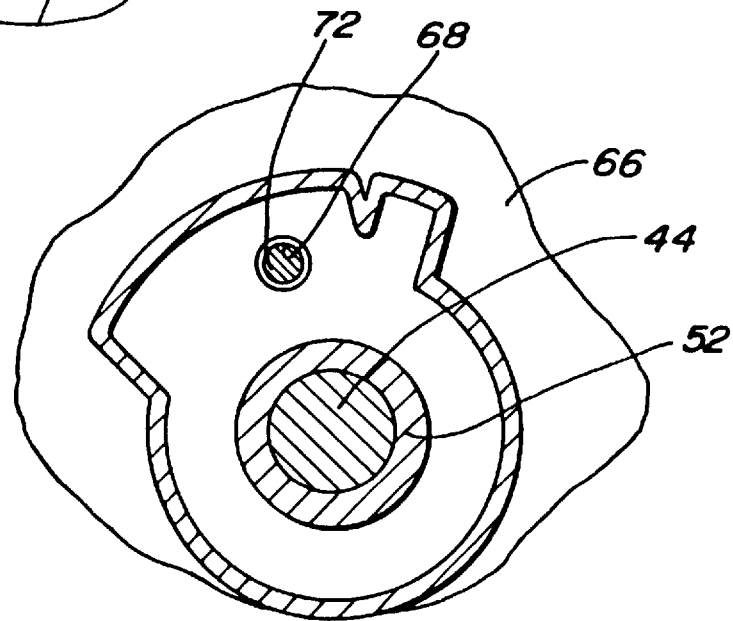
_Fig-4_

ARMATURE SHAFT DEFLECTION LIMITER

This application is a continuation of application Ser. No. 08/315,208, filed on Sep. 29, 1994 now U.S. Pat. No. 5,873,282, which is incorporated herein by reference thereto.

FIELD OF THE INVENTION

The present invention relates generally to electrically powered tools, and more particularly, to an apparatus for limiting motor armature shaft deflection of such power tools.

BACKGROUND OF THE INVENTION

An electrically powered tool, such as a portable rotary hand held saw and the like, typically includes an electric motor for providing a source of power which is transmitted through a gear train to the saw blade or other implement for performing the intended work. As can be appreciated, there is a large amount of force exerted on the implement as it is worked through the material. This force, which is generated by the electric motor, is conducted through the gear train to the implement. Therefore, the gear train and the electric motor are necessarily designed to withstand the high stresses resulting from these forces.

The loads, and therefore the stresses, experienced by the gear train and the motor vary with the cutting conditions. When the power tool is freewheeling, i.e., the tool is operating but the implement is not cutting through material, the loading of the gear train is fairly low. When the tool is cutting easily through a piece of material, the loading of the gear train is still of fairly low magnitude. However, if the tool bogs down or "stalls" in the material, i.e., the implement is no longer moving smoothly through or is stuck in the workpiece, the loading and stresses acting on the gear train increase.

Although the implement may have "stalled" in the workpiece, the driving torque from the electric motor will continue and the force acting on the gear teeth may tend to force the gears apart and drive the armature shaft radially outwardly. If the armature shaft should deflect radially, the loading condition on the gear train will be further aggravated because the driving connection thereon will be via the tips of the gear teeth instead of against the faces of the gear teeth.

Therefore, to ensure that the gear teeth do not fracture or otherwise fail under such loading conditions, and hence, to ensure a long reliable life for the power tool, the gears are made from hardened steel. Hardened steel gears, however, are typically more difficult to manufacture and are more expensive as compared to other types of gears such as powdered metal gears. In addition to providing for hardened steel gears, care must also be taken to provide enhanced support bearings for the various elements of the power tool gear train to ensure that they too are not damaged by the adverse loading conditions, and particularly, by shaft deflection.

In U.S. Pat. No. 3,973,449, it has been suggested that armature shaft deflection may be limited by supporting the distal end of the armature shaft in a bearing. However, this solution has been found to suffer from a number of disadvantages. The armature shaft is typically supported in a pair of bearings located, respectively, at each end of the armature winding. If a third bearing is added to support the distal end of the armature shaft, the armature shaft would then be supported in three bearings at spaced locations. Because of the tolerances inherent in the design of power tools, the accurate alignment of a single shaft in three spaced bearings is difficult. Misalignment will, of course, cause the development of friction and excessive heat in the bearings, leading to poor performance and potential failure of the device. Furthermore, the supporting of the distal shaft end in a bearing is difficult because the bearing is frequently located adjacent to an external housing wall typically made of plastic. The friction and heat generated in the bearing can lead to bearing failure and can lead to melting of the plastic housing in which the bearing is supported. Accordingly, it is, therefore, desirable to develop an improved durable mechanism for limiting shaft deflection with higher tolerances.

SUMMARY OF THE INVENTION

The present invention is directed to an apparatus for alleviating this type of loading condition by limiting deflection of the armature shaft of the electrically powered tool. The shaft deflection limiter may be designed in a variety of ways. In a first preferred embodiment according to this invention, the armature shaft extends as a cantilever from the motor, a driven shaft has a first end portion journalled for rotation within a sleeve member and connected to a saw blade, and power is transmitted from the motor to the saw blade via a geared connection operating between the armature shaft and the driven shaft.

According to this embodiment, a plate member is provided with a first and a second aperture and supported in the motor housing, the sleeve member is disposed at least in part in the first aperture, and the armature shaft is formed with a reduced diameter pilot portion which is disposed at least in part in the second aperture. The apertures are located so as to assist in maintaining the axes of the two shafts in generally parallel relation. The cross-section of the first aperture and the sleeve member are dimensioned so as to provide a snug fit therebetween. The pilot portion is slightly smaller in diameter than that of the second aperture such that during normal operation of the power tool, there is a small clearance between the pilot portion and the aperture.

When a severe loading condition exists, causing the armature shaft to deflect, the pilot portion will move towards, and in the worst case, into engagement with the wall of the aperture. That is, deflection of the pilot portion is limited to an amount equal to the small clearance between the pilot portion and the aperture. In this manner, the gears of the power tool are limited from separating, the gear teeth loads are distributed over the face of the gear teeth, not at the tips, and the gear teeth bending load is not adversely increased.

In a second preferred embodiment according to this invention, a cylindrical boss or pilot extends axially from the plate member, and the armature shaft is formed with a blind axial bore. The cross-sectional diameters of the boss and the bore are such that a small clearance is formed therebetween and the boss will project into the axial bore. The boss could be integrally formed with or secured to the plate member.

Under normal operating conditions, the small clearance is maintained between the boss and the bore. However, if loading conditions rise to a level causing deflection of the armature shaft, the wall of the bore will deflect, and in the worst case, into contact with the boss and the boss will prevent further deflection of the armature shaft.

In a third preferred embodiment according to the invention, the shaft deflection limiter comprises (1) a bearing supported in a tool housing and (2) a pilot formed on the distal end of the armature shaft and disposed in the bearing aperture. The outer diameter of the pilot and the inner diameter of the bearing are chosen such that there is a small clearance formed in the bearing aperture between the pilot and the inner diameter of the bearing during normal operation of the power tool. This embodiment provides reduced friction and heat generation when the shaft is adversely loaded and the pilot engages the bearing.

These and other advantages and features of the present invention will become apparent to those skilled in the art from studying the following detailed description of the preferred embodiments, subjoined claims and drawings.

BRIEF DESCRIPTION OF THE DRAWINGS

FIG. 4 is an end view taken along line 4—4 of FIG. 2.

FIG. 5 is an end view taken along line 5—5 of FIG. 2 illustrating the loading of the gear teeth under an adverse condition.

DETAILED DESCRIPTION OF THE INVENTION

Figure 1:
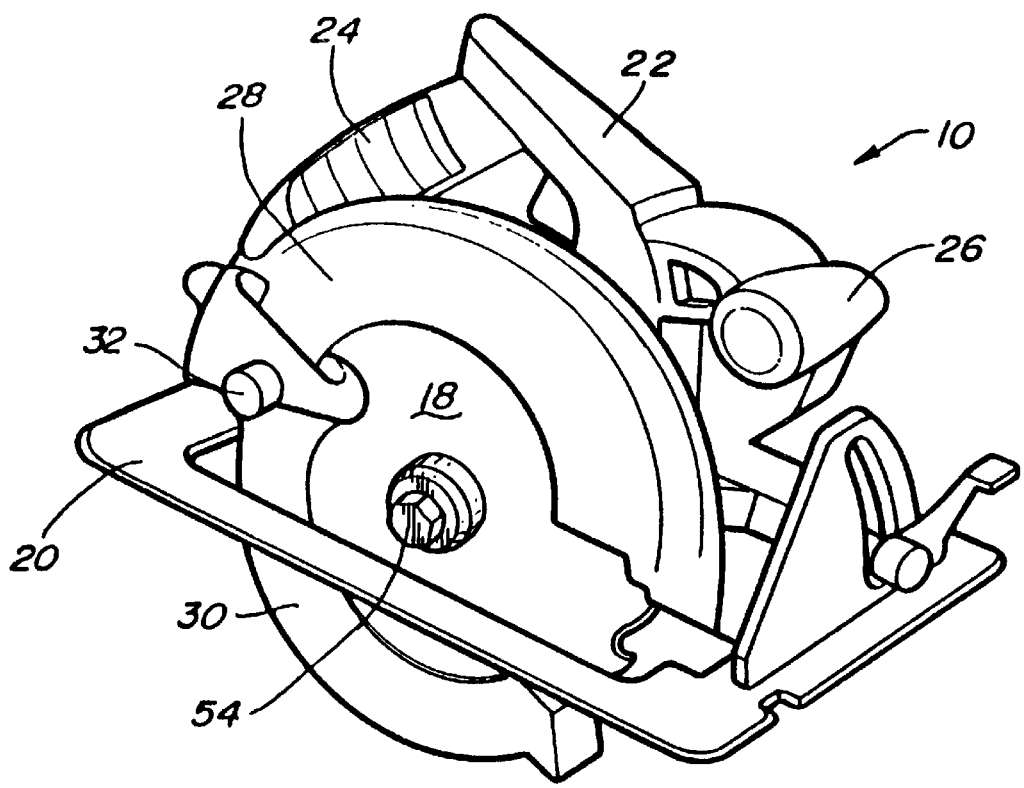
FIG. 1 is a perspective view of a typical portable electric saw configured with an armature shaft deflection limiter according to a first preferred embodiment of the present invention.
Figure 7:
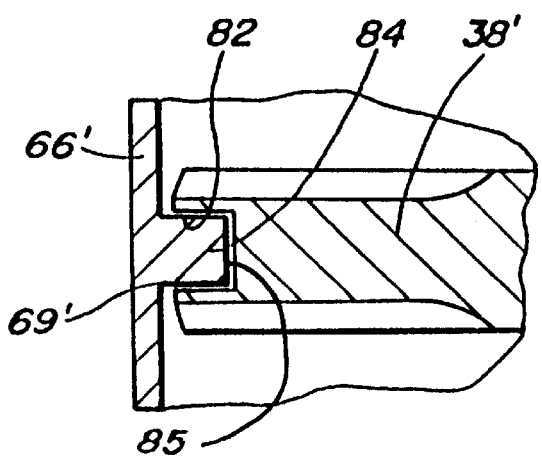
FIG. 7 is a partial cross-sectional view of the electric saw shown in FIG. 1 configured with an armature shaft deflection limiter according to a second preferred embodiment of the present invention.
Figure 8:
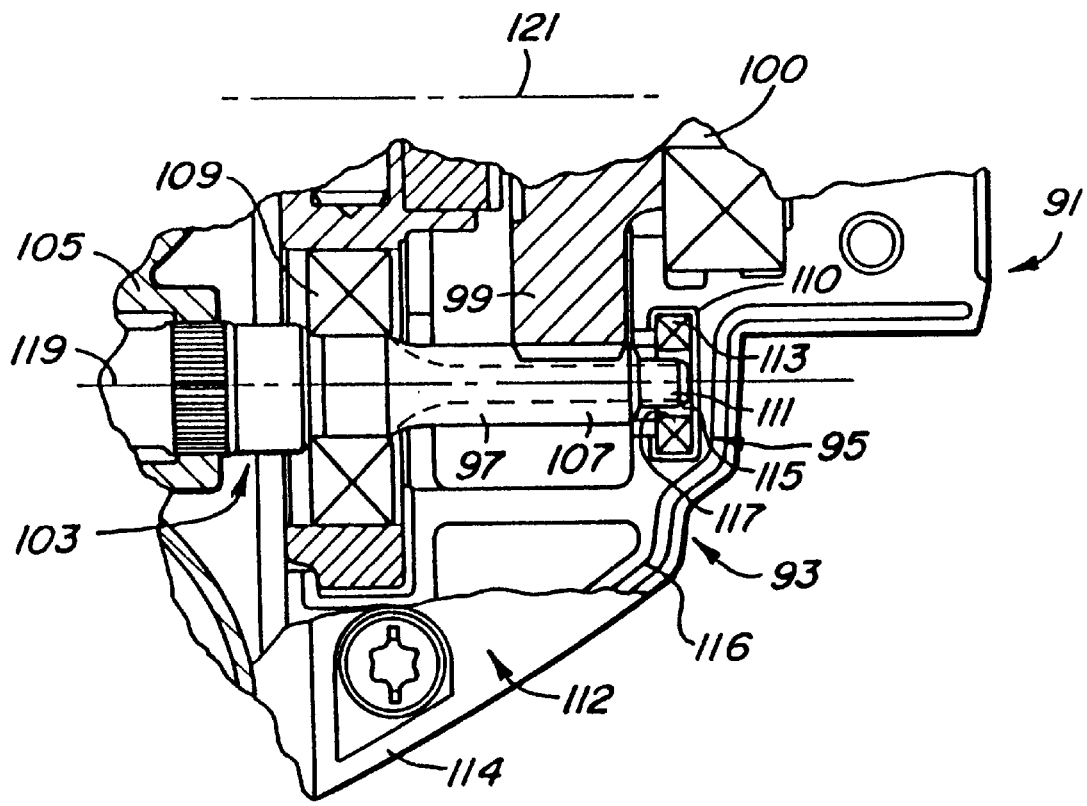
FIG. 8 is a fragmentary cross-sectional view of a hammer drill including a gear train with an armature shaft deflection limiter according to a third preferred embodiment of the present invention.

The present invention is described in terms of preferred embodiments adapted to a portable hand held rotary electric saw (FIGS. 1–7) and to a hammer drill (FIG. 8). It will, however, be readily apparent to one skilled in the art that its teachings will find broader applications than those described herein, and particularly, in the field of electrically powered tools.

Turning now to the drawings, FIGS. 1–6 show a typical portable electric saw 10 configured with a deflection limiter according to the present invention. The portable saw 10 includes a motor housing 12 which forms an interior chamber, an electric motor 14 supported in the chamber, a gear case 16 secured to the housing in a suitable manner, and a circular saw blade 18 connected to the motor. The portable saw 10 further includes a substantially-flat shoe plate 20 for supporting the motor housing 12 on the surface of a workpiece, a control handle 22 provided with a trigger switch 24 for energizing the unit, a front knob 26 for assisting in guiding the saw blade through the workpiece, an upper blade guard 28 and a lower guard 30 which pivots into the upper blade guard 28 upon engagement of the saw blade 18 with the workpiece. A lever 32 is conventionally provided for manually pivoting and or adjusting the lower blade guard 30.

Figure 2:
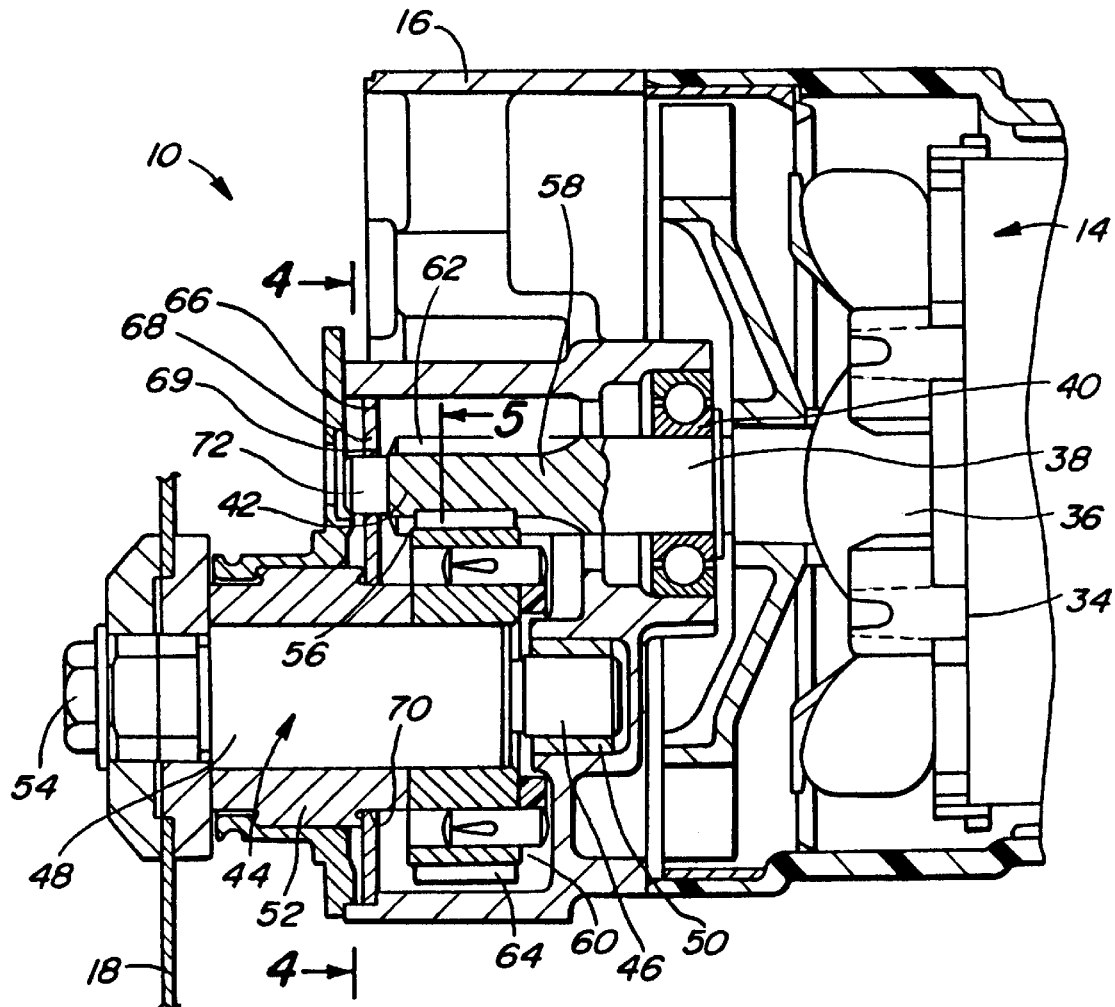
FIG. 2 is a partial cross-sectional view of the electric saw shown in FIG. 1 illustrating a gear train for transmitting torque from the armature shaft to a driven shaft.
Figure 3:
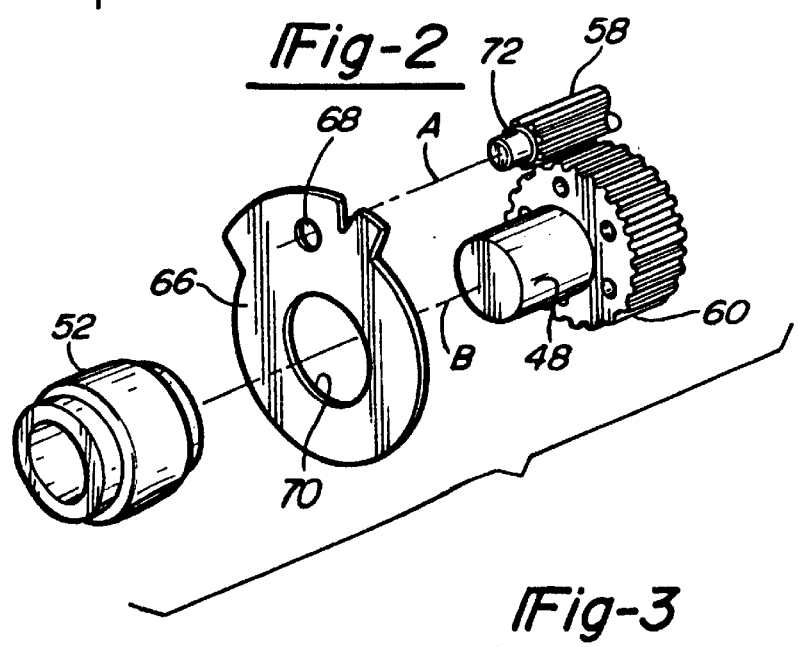
FIG. 3 is an exploded perspective view, at least in part, of the gear train, the drive shaft and the armature shaft shown in FIG. 2.

The electric motor 14 is conventional and includes a field 34 and an armature 36. As can be seen in FIG. 2, an armature shaft 38 extends in a cantilevered fashion from the armature 36 and has a first end portion supported for rotation in a stationary roller bearing 40 and a free end portion 42 spaced from the bearing as is conventional for portable saws of this type.

An arbor 44 has first and second end portions 46 and 48 with the first end portion 46 being supported for rotation in a stationary bearing 50 mounted in the gear case 16 and the second end portion 48 being journalled for rotation in a sleeve member 52. The saw blade 18 is connected to the second end of the arbor 44 so as to be in a plane substantially perpendicular to the axis of rotation of the arbor and extend below the shoe plate 20 for engaging the workpiece. As shown, the connection of the saw blade 18 to the arbor 44 is by means of a bolt assembly 54.

A gear train 56 is utilized to transmit driving torque from the motor 14 to the saw blade 18. In this regard, the gear train includes a pinion gear 58 fixedly connected to the armature shaft 38 for rotation therewith and a spur gear 60 fixedly connected to the arbor 44 for rotation therewith. The pinion gear 58 includes a plurality of radial gear teeth 62 each extending axially from the armature 36 for meshed engagement with respective helical gear teeth 64 formed about the circumference of the spur gear 60.

According to a preferred embodiment of the present invention, a plate member 66 is mounted to the gear case 16. The plate member 66 has upper and lower openings 68 and 70 and the free end portion 42 of the armature shaft 38 is formed with a reduced diameter pilot portion 72. The pilot portion 72 is generally cylindrical and extends axially from the armature shaft 38 into the upper aperture 68 formed in the plate member 64. The aperture 68 is generally circular and slightly larger in diameter than the cross-section of the pilot portion 70 whereby to form a small clearance 69 therebetween. The sleeve member 52 is generally cylindrical and the outer periphery thereof is adapted to fit snugly in the lower aperture 70 formed in the plate member 64.

In normal operation of the electric saw 10, there is no contact between the pilot portion 72 and the upper aperture 68. As will be appreciated, the upper aperture 68 will inhibit the free end portion 42 of the armature shaft 38 from undergoing deflection in a direction transverse to its axis of rotation "A" by its engagement with the pilot portion 72. Importantly, the apertures 68 and 70 in the plate member 64 cooperate to maintain the respective axes of rotation "A" and "B" of the armature shaft 38 and the arbor 44 generally parallel to one another.

Figure 6:
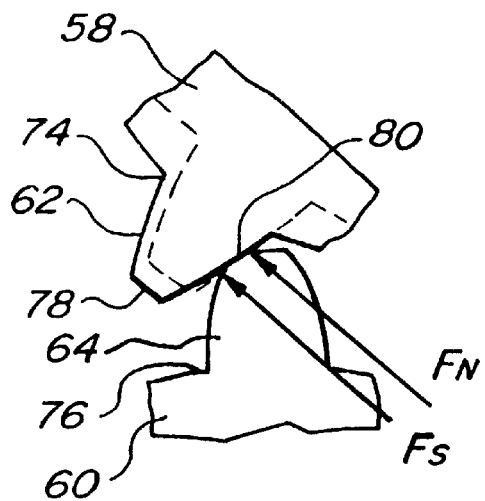
FIG. 6 is an enlarged view illustrating the loading of the gear teeth under normal operation and under an adverse condition.

As is known, the highest stresses in gear teeth occur at the point of contact between the mating gear and in the fillet at the base of the gear tooth due to the bending moment created by the contact force. With reference to FIG. 6, a force from pinion gear tooth 62 against a spur gear tooth 64 is indicated by the arrow Fn and directed against the faces of the gear teeth.

In the event that the saw blade 18 stalls in the material, the torque delivered by the electric motor 14 will continue to act on the gear teeth 62 and 64 and tend to drive the pinion gear 58 and the spur gear 60 apart due to a component of the force opposing the engagement of the gears. The pinion gear 58 will tend to move away from meshed engagement with the spur gear 50 due to deflection of the armature shaft 38. As a result, the armature shaft 38 could tend to deflect away from the arbor 44. This situation causes a severe loading condition between the gear teeth 62 and 64. FIG. 5 illustrates the situation where the axis of rotation "A" of the armature shaft 38 moves from its original position to a new point "A'".

Under this condition, the gear teeth 60 and 62 take on the relationship shown in phantom in FIG. 6 wherein the contact force between gear 62 and 64 is now applied to the tip of the gear tooth, as indicated by the arrow Fs. Hence, the stresses in the fillets 74 and 76 of the gear teeth 62 and 64, respectively, due to the bending moment, are increased due to the greater moment arm that force Fs acts on. In addition, the contact stress is now concentrated at the tips 78 and 80 of the gear teeth 62 and 64, as opposed to being distributed over the face of the gear tooth as in normal loading conditions. Loading the tips 78 and 80 of the gear teeth 62 and 64 promotes cracking and chipping of the gear teeth while the increased moment causes increased stress at the base of the gear tooth potentially leading to fatigue fracture.

In short, repeated loading of the gear train in this fashion will ultimately lead to the failure of the gears requiring service for the power tool. Limiting deflection of the armature shaft 38 to the clearance 69 between the pilot portion 72 and the upper aperture 68 substantially maintains the pinion gear 58 in normal contact with the spur gear 60 and operates to obviate the severe loading condition described.

With reference to FIG. 7, a second embodiment of the present invention is shown. Primed reference numerals are used to identify elements which are modified from the preceding embodiment.

As can be seen in FIG. 7, an armature shaft 38' is formed with a blind axial bore 82 and a plate member 66' is formed with a generally cylindrical boss 84. The plate member 66' is suitably secured to the gear case 16 such that the boss 84 extends into the axial bore 82. The cross-section of the bore 82 is dimensioned to be slightly greater than the cross-section of the boss 84 such that a small gap 69' is defined therebetween.

In normal operation, the boss 84 does not contact the wall of the bore 82. However, under loading conditions causing deflection of the armature shaft 38', the bore 82 engages the boss 84 for preventing deflection of the armature shaft 38' and maintaining substantially normal contact between the pinion gear 58 and the spur gear 60.

As illustrated in FIG. 7, a gap 85 is formed between the interfacing outboard face of the cylindrical boss 84 and the floor of the blind bore 82. The gap 85 is greater than the small gap 69' and is sufficient to allow the axially lateral deflection of the shaft 38' in keeping with the invention as set forth with respect to the embodiments illustrated in FIG. 2, 3 and 8. In this manner, any deflection under abnormal loads placed on the shaft 38' will be lateral of the axis thereof and not sufficient in a forward axial direction for the floor of the bore 82 to engage the outboard face of the boss 84.

While the boss 84 is shown integrally formed with the plate member 64' and generally cylindrical in cross-section, the securement and cross-section could be otherwise. For example, the boss could be separately fastened to the plate member 66'. In such manner, the amount of armature shaft deflection could be varied, depending on the model.

As will be appreciated from the foregoing discussion of the present invention, the pinion gear 58 and the spur gear 60 will no longer be subjected to adverse loading conditions. Therefore, there is no longer a need to specify hardened steel gears, which are typically more difficult and expensive to manufacture, to ensure reliable performance of the power tool. Also, the reliability of the bearings supporting the armature shaft is increased due to elimination of adverse loading due to armature shaft deflection.

In FIG. 8, a fragmentary axial cross-sectional view of a hammer drill 91 incorporating a gear train 93 with a third embodiment of a shaft deflection limiter 95 is shown. The gear train 93 comprises a pinion 97 and a spur gear 99. For simplicity, pinion 97 and spur gear 99 are illustrated as spur gears. However, helical gears are preferably used. Spur gear 99 is rotatably fixed to an output shaft 100 of hammer drill 91. Pinion 97 is integrally formed on an armature shaft 103 for a drive motor 105. Shaft 103 has a distal end 107 extending as a cantilever from bearing 109 and thus is subject to deflection under adverse loading conditions as explained in the first and second embodiments.

To prevent excessive shaft deflection, a shaft deflection limiter 95 is formed by a pilot 111 formed on distal end 107 and a roller bearing 113 for receiving pilot 111. Bearing 113 is supported in pockets 110 (only one shown) formed in each half 114, 116 of clam shell housing 112. Pilot 111 and bearing 113 are sized such that there is a small clearance 115 formed in bearing aperture 117 between the inner diameter of bearing 113 and the outer diameter of pilot 111. As an example, in one embodiment, pilot 111 is 4.5 mm in diameter, bearing aperture 117 is 5 mm in diameter and clearance 115 is 0.25 mm (radially). Clearance 115 should be dimensioned to be a minimum to permit pilot 111 to rotate freely under normal operating conditions and to engage bearing 113 only under adverse loading conditions to maintain the axis of rotation 119 of shaft 103 substantially parallel to the axis of rotation 121 of gear 99.

In accordance with the present invention as explained in the embodiments described herein, the shaft deflection limiter may be constituted by piloting the armature shaft 38, 38', 103 in an apertured plate 66, on a cylindrical boss 84, or in a roller bearing 113, respectively. The limiter may also comprise a sleeve bearing or washer substituted for bearing 113.

While specific embodiments of the invention have been shown and described in detail to illustrate the principles of the present invention, it will be understood that the invention may be embodied otherwise without departing from such principles. For example, one skilled in the art readily recognize from such discussion and from the accompanying drawings and claims that various changes, modifications and variations can be made therein without department from the spirit and scope of the invention as described in the following claims.

What is claimed is:

1. A shaft deflection limiter for a power tool which is adapted to deliver driving power from a source through a shaft having an axis and a gear train to a working implement comprising:

a free end portion of the shaft extending in cantilever from the remainder of the shaft;

an axial bore formed in an axially facing end face of the free end portion of the shaft and formed with a floor and a side wall;

a member having a boss extending axially therefrom;

the member being mounted adjacent the shaft such that the boss extends in cantilever into the axial bore; and the boss and the axial bore being sized to allow the axial bore of the shaft to move freely about the boss without the floor and the side wall of the axial bore engaging any portion of the boss under normal loading conditions on the gear train and to engage the side wall only of the axial bore under adverse loading conditions on the gear train.

2. The shaft deflection limiter of claim 1 wherein the gear train includes an arbor having an axis in parallel with the axis of the shaft and the axial bore and the member further comprises means for limiting deflection of the shaft relative to the arbor and laterally of the axis of the arbor.

3. The shaft deflection limiter of claim 2 wherein the source comprises an electric motor and the shaft is the armature shaft of the electric motor.

4. The shaft deflection limiter of claim 3 wherein the gear train includes a pinion fixedly disposed for rotation with the shaft.

5. In a gear drive for direct connected power driven units, the combination of a housing having an interior chamber, a driving shaft and a driven shaft each having an axis of rotation, the axes of rotation of said shafts being generally parallel to one another, and each said shaft having a first end portion supported in a respective stationary bearing in said chamber and a second end portion, support means for positioning the second end portion of said driven shaft relative to and spaced from said housing, the second end portion of said driving shaft being overhung beyond its bearing, the second end portion of said driven shaft being unobstructed axially in a direction of the cantilever thereof, a geared driving connection between said second end portions, and limit means, normally out of contact with the driving shaft, for limiting any axially lateral deflection only of the overhung portion of said driving shaft to counteract torque resulting from the driving connection between the shafts;

said support means comprises a plate located within the interior chamber of said housing and disposed in a plane transverse to the axes of rotation of said shafts, and said limit means comprises an axial pin which extends from said plate and a bore which is formed in the second end portion of said driving shaft, the pin being disposed for movement within said bore.

6. The gear drive as claimed in claim 5 wherein said axial pin is integrally formed with said plate.

7. In a gear drive for direct connected power driven units, the combination of a housing having a support wall, a driving shaft and a driven shaft each having a first end portion and a second end portion disposed generally along its respective axis of rotation and the respective axes extending generally parallel to one another, each said shaft having the first end portion supported in a respective stationary bearing in said housing and a second end portion spaced from its stationary bearing, and a geared driving connection between the second end portions of said driving and driven shafts, the improvement wherein said housing includes a support wall which supports and prevents the second end portion of said driven shaft from moving in a direction transverse to the second end portion of said driving shaft, the second end portion of said driving shaft being unobstructed in an axial direction, at least during normal loading conditions, and means operably associating said driving shaft with said support wall comprising a socket and a pilot member associated with said support wall and the outer portion of said driving shaft for permitting the second end portion of said driving shaft to undergo only a predetermined amount of movement in a direction transverse to its axis of rotation whereby to counteract torques resulting from the driving connection between the shafts, and wherein said pilot member extends from said support wall.

8. The gear drive as claimed in claim 7 wherein said socket extends axially inwardly from the second end of said driving shaft.

* * * * *